Sept. 27, 1966  S. H. AULD, JR  3,275,268
AUTOMATIC CONTROL FOR AIRCRAFT
Filed Oct. 30, 1961
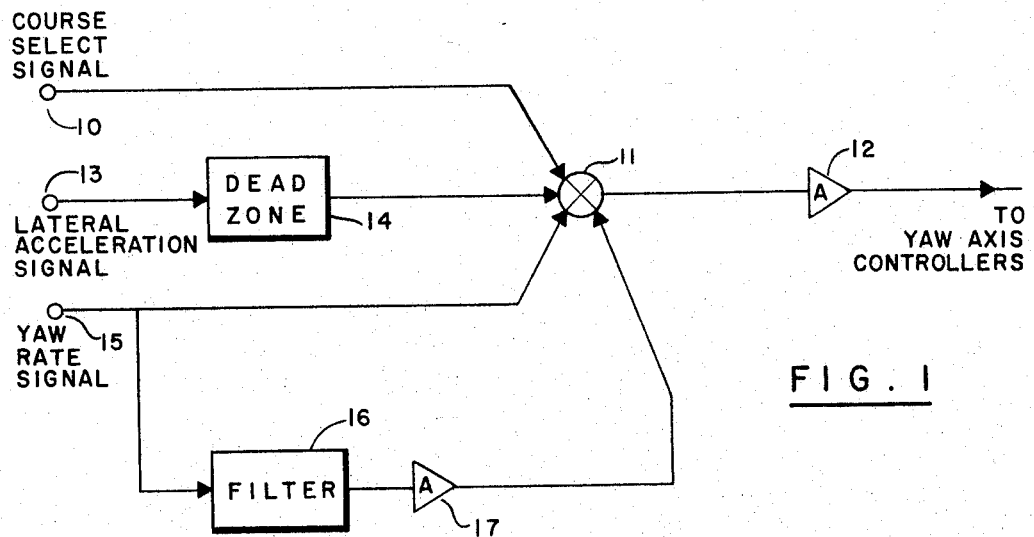
FIG. 1
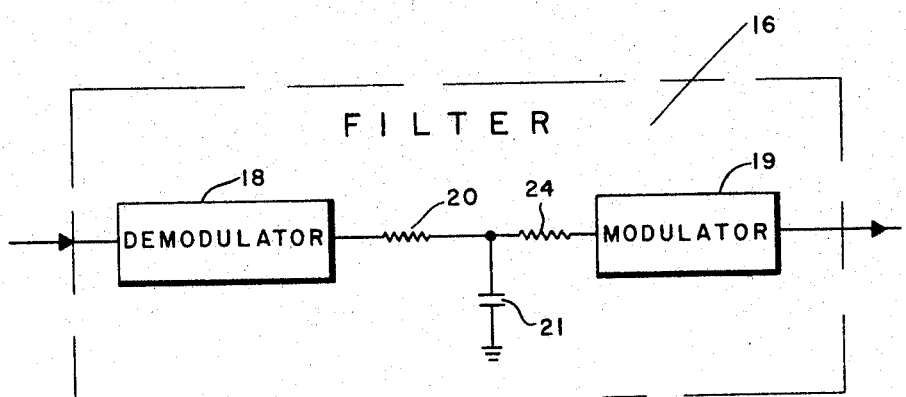
FIG. 2
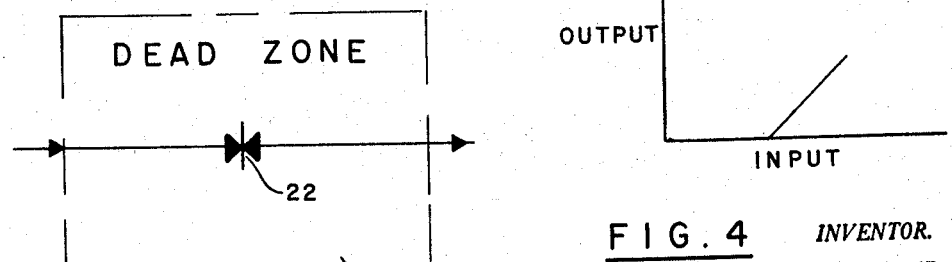
FIG. 3
FIG. 4
INVENTOR.
SAMUEL H. AULD, JR.
BY
Richard P. Alberi
AGENT 3,275,268
AUTOMATIC CONTROL FOR AIRCRAFT
Samuel H. Auld, Jr., Woodland Hills, Calif., assignor to Lear Siegler, Inc., Santa Monica, Calif., a corporation of Delaware
Filed Oct. 30, 1961, Ser. No. 148,630
7 Claims. (Cl. 244—77)

This invention relates to automatic controls for aircraft and, more particularly, to automatic controls for the yaw axis of the aircraft.

In the past, aircraft generally have been controlled in the yaw axis by a yaw rate gyro and a lateral accelerometer. The yaw rate gyro detects yawing disturbances and supplies a signal to the yaw axis controllers to counter the disturbance. The lateral accelerometer senses lateral accelerations (slip or skid) and applies a signal to the yaw axis controllers to minimize lateral accelerations. It is desirable to maintain the aircraft on a very precise path (ILS for example) by banking the aircraft as required while the yaw axis holds the required heading by reason of a heading signal applied to the yaw axis.

It is well known that gimbaling errors in the usual directional gydroscopic references from which the course select signal is obtained limit the tightness of the possible heading control.

It is, therefore, an object of this invention to provide automatic controllers for the yaw axis of the aircraft which will accept heading signals from a cource selector in order to hold the aircraft on the selected heading with great accuracy and without regard to lateral accelerations, except that aircraft integrity shall not be compromised.

It is another object of the present invention to provide means of increasing heading tightness without suffering the effects of gimbal errors.

It is a further object of the present invention to provide means of suppressing the signals from the lateral accelerometer (which would cause heading errors) until slip or skid becomes sufficient to endanger the aircraft.

A better understanding of the objects and advantages of the present invention will become apparent from the following description when taken into conjunction with the drawings in which:

FIG. 1 is a schematic of the present invention;
FIG. 2 is a schematic of the filter in FIG. 1;
FIG. 3 is a schematic of the dead zone in FIG. 1; and
FIG. 4 is the wave form diagram of the input and output of the circuit in FIG. 3.

Referring to the drawings, a course select error signal is presented to terminal 10. This course select error signal is a signal representing the error between the selected heading and the actual heading of the aircraft as represented by a direction gyroscope signal. It may be obtained in any one of the well known ways in the art. Terminal 10 is electrically connected to adder circuit 11. Adder circuit 11 is a conventional adder circuit, again, well known in the art. The output of adder circuit 11 is connected to the input of amplifier 12, and the output of amplifier 12 is electrically connected to the yaw axis controllers of the aircraft. The lateral acceleration signal is presented to terminal 13. The lateral acceleration signal represents lateral acceleration of the aircraft and is determined by any of the well known methods in the art for example an accelerometer. Dead zone 14 is electrically connected to terminal 13 and the output of dead zone 14 is electrically connected to the adder circuit 11. A yaw rate signal is presented to terminal 15. The yaw rate signal may be obtained in any of the well known ways in the art and represents the rate of turn of the aircraft about the yaw axis. Terminal 15 is electrically connected to adder circuit 11. The input to filter 16 is also electrically connected to terminal 15, so that the signal on terminal 15 is sent to both adder circuit 11 and to filter 16. Filter 16 is electrically connected to adder circiut 11 by way of amplifier 17.

Demodulator 18 of filter 16 is electrically connected to the input of filter 16. A modulator 19 is electrically connected to the output of demodulator 18 by way of resistors 20 and 24. Capacitor 21 is connected on one side between resistors 20 and 24 and on the other side to ground. It is to be noted that the filter 16 as shown in FIG. 2 is a typical filter and any other circuitry, providing the same results, may be used without altering the advantages of the present invention.

The dead zone circuit 14, as shown in FIG. 3, in its simplest form, may comprise merely a double zener diode 22. The effect of the double zener diode 22 is to suppress all lateral acceleration signals below a given magnitude; the given magnitude being the breakdown voltage of the double zener diode 22. Consequently, as shown in FIG. 4, any input to the dead zone below the given magnitude of the breakdown voltage of double zener diode 22, is not allowed to pass to the adder circuit 11, whereas signals above the breakdown voltage of the double zener diode 22 pass on to adder circuit 11.

In operation, the course select error signal is fed directly to the adder circuit 11 through amplifier 12 and on to the yaw axis controller in the normal fashion. As stated above, this signal contains gimbaling errors which tend to make the aircraft hunt on certain headings when high tightness is employed. In order to prevent this from happening, the course select gain is reduced sufficiently, and a short term heading signal which is actually the integral of the yaw rate gyro is added to make up the required tightness of control. The integral signal is generated by filter 16 in conjunction with demodulator 18 and modulator 19. The filter, consisting of resistors 20 and 24 and capacitor 21 is seen to be a conventional low pass or "integrator." The output of the filter is truly a heading displacement signal, since the integral of rate is always displacement. The direct yaw rate gyro signal is also applied directly to amplifier 12 in order to provide control against yawing disturbances.

The lateral acceleration signal on 13 is a signal proportional to the lateral acceleration (slip or skid) of the aircraft. Should the aircraft slip or skid laterally sufficient to damage the aircraft, it is desirable to allow the rudder to minimize the slip or skid. The dead zone 14 suppresses any lateral acceleration signal below a predetermined value which is the breakdown voltage of the double zener diode 22. However, when the lateral acceleration signal is above the predetermined value, then that portion above the predetermined value is allowed to pass through the adder circuit 11, and to position the rudder so as to prevent any further acceleration.

It has been found that this system when used in conjunction with a roll axis controller allows a tightness of flight path control far exceeding the present state of the art. Furthermore, the lateral acceleration signal in conjunction with the dead zone 14 provides a safety factor for side-slip of the aircraft.

Although this invention has been particularly described above, it is not intended that it should be limited by the above description, but only in accordance with the spirit and scope of the appended claims.

I claim:
1. A control system for automatically controlling an aircraft about its yaw axis comprising:
   automatic course select means to automatically emit a first electrical signal proportional to the error be- tween a selected course heading and the actual heading of said aircraft,
means to emit a second electrical signal proportional to the rate of turn of said aircraft about the yaw axis,
a signal adding means,
first means connecting said signal adding means to said automatic course select signal emitting means for directly applying said course select error signal to said adding means,
second means connecting said rate of turn signal emitting means to said adding means for directly applying said rate of turn signal to said adding means,
filter means responsive to said second electrical signal to provide a third electrical signal which is an electrical integral of said second electrical signal,
third means connecting said filter means directly to said adding means for application of said third electrical signal to said adding means, and
yaw axis control means for the aircraft connected to said signal adding means and responsive to the combined signal thereat for controlling movements of the aircraft about said yaw axis.

2. An automatic control for the yaw axis of an aircraft comprising:
course select error signal means to emit a first electrical signal proportional to the error between the selected course heading and the actual heading of said aircraft,
yaw rate signal means to emit a second electrical signal proportional to the rate of turn of said aircraft about the yaw axis,
filter means responsive to said second electrical signal to provide a third electrical signal which is an electrical integral of said second signal adding means,
first and second connecting means individually connected between said signal adding means and said first and second signal emitting means for respectively applying said course select error signal and said rate of turn signal directly to said signal adding means and third connecting means connected between said signal adding means and said filter means, and
means responsive to the addition of said first, second and third electrical signals to control said aircraft about said yaw axis.

3. The device as claimed in claim 1 wherein said filter means is an integrator.

4. The device as claimed in claim 1 wherein said yaw rate signal means to emit a second electrical signal proportional to the rate of turn of said aircraft about the yaw axis is a rate gyroscope.

5. An automatic control for the yaw axis of an aircraft comprising:
course select error signal means to emit a first electrical signal proportional to the error between the selected course heading and the actual heading of said aircraft,
a rate gyroscope emitting a second electrical signal proportional to the rate of turn of said aircraft about the yaw axis,
filter means comprising:
    a demodulator,
    a resistor, and
    a modulator, said demodulator, said resistor, and said modulator being connected in series such that said resistor is connected between said demodulator and said modulator,
    a capacitor having one side thereof connected to the modulator side of said resistor and the other side connected to ground, said demodulator being connected to receive said second electrical signal and said modulator emitting a third signal which is the integral of said second electrical signal,
a lateral accelerometer,
a dead zone circuit, said dead zone circuit including means to reject electrical signals from said accelerometer below a predetermined magnitude and allows signals from said accelerometer above a predetermined magnitude to pass through said dead zone circuit, and
adding means to add said first, second, and third electrical signals with the output signal from said dead zone circuit to control said aircraft about said yaw axis.

6. An automatic control for the yaw axis of an aircraft comprising:
course select error signal means to emit a first electrical signal proportional to the error between the selected course heading and the actual heading of said aircraft,
yaw rate signal means to emit a second electrical signal proportional to the rate of turn of said aircraft about the yaw axis,
filter means responsive to said second electrical signal to provide a third electrical signal which is an electrical integral of said second electrical signal,
lateral accelerometer signal means to detect the sideslip of said aircraft and emit a fourth electrical signal having a phase and magnitude to cause said aircraft to turn into said side-slip of said aircraft, said lateral accelerometer signal means comprising:
    a lateral accelerometer and a dead zone circuit,
    said dead zone circuit including means to reject electrical signals from said accelerometer below a predetermined magnitude and allow signals from said accelerometer above a predetermined magnitude to pass through said dead zone circuit, and
    adding means to add said first, second, third and fourth electrical signals to provide an output signal.

7. An automatic control system for the yaw axis of an aircraft comprising:
course select error signal means to emit a first electrical signal proportional to the error between the selected course heading and the actual heading of said aircraft,
a rate gyroscope emitting a second electrical signal proportional to the rate of turn of said aircraft about the yaw axis,
filter means responsive to said second electrical signal to provide a third electrical signal which is an electrical integral of said second electrical signal,
a lateral accelerometer, a dead zone circuit, said dead zone circuit including means to reject electrical signals from said accelerometer below a predetermined magnitude and allow signals from said accelerometer above a predetermined magnitude to pass through said dead zone circuit and
adding means to add said first, second, and third electrical signals with the output signal from said dead zone circuit to control said aircraft about said yaw axis.

References Cited by the Examiner
UNITED STATES PATENTS

| | | | |
|---|---|---|---|
| 2,827,250 | 3/1958 | Rusler | 244—77 |
| 2,869,804 | 1/1959 | Muninch et al. | 244—77 |
| 2,896,883 | 7/1959 | Andeen | 244—77 |
| 2,936,136 | 5/1960 | Jofeh et al. | 244—77 |
| 3,035,795 | 5/1962 | Larson | 244—77 |
| 3,071,335 | 1/1963 | Carter | 244—77 |

FERGUS S. MIDDLETON, *Primary Examiner.*